United States Patent
Siems et al.

(10) Patent No.: US 11,590,607 B2
(45) Date of Patent: Feb. 28, 2023

(54) METHOD AND DEVICE FOR MACHINING BY MEANS OF INTERFERING LASER RADIATION

(71) Applicants: Fraunhofer-Gesellschaft zur Förderung der Angewandten Forschung E.V., Munich (DE); Friedrich-Schiller-Universität Jena, Jena (DE)

(72) Inventors: Malte Per Siems, Jena (DE); Stefan Nolte, Jena (DE); Daniel Richter, Jena (DE); Ria Krämer, Jena (DE); Thorsten Albert Goebel, Jena (DE)

(73) Assignees: Fraunhofer-Gesellschaft zur Förderung der angewandten Forschung e.V., Munich (DE); Friedrich-Schiller-Universität Jena, Jena (DE)

( * ) Notice: Subject to any disclaimer, the term of this patent is extended or adjusted under 35 U.S.C. 154(b) by 0 days.

(21) Appl. No.: 16/978,718

(22) PCT Filed: Mar. 7, 2019

(86) PCT No.: PCT/EP2019/055651
§ 371 (c)(1),
(2) Date: Sep. 7, 2020

(87) PCT Pub. No.: WO2019/170792
PCT Pub. Date: Sep. 12, 2019

(65) Prior Publication Data
US 2020/0398374 A1 Dec. 24, 2020

(30) Foreign Application Priority Data
Mar. 7, 2018 (DE) .................. 10 2018 105 254.5

(51) Int. Cl.
*B23K 26/067* (2006.01)
*B23K 26/0622* (2014.01)
(Continued)

(52) U.S. Cl.
CPC ........ *B23K 26/0676* (2013.01); *B23K 26/066* (2015.10); *B23K 26/0624* (2015.10); *B23K 26/0626* (2013.01)

(58) Field of Classification Search
CPC ........... B23K 26/03–032; B23K 26/067–0676; B23K 26/06–0643; B23K 26/0648; B23K 26/0652; B23K 26/066
See application file for complete search history.

(56) References Cited

U.S. PATENT DOCUMENTS

2002/0190040 A1* 12/2002 Thompson, Jr. ...... B23K 26/705
219/121.73
2003/0010889 A1* 1/2003 Igasaki .................. G02B 26/06
250/201.9
(Continued)

FOREIGN PATENT DOCUMENTS

CN 106624354 5/2017
CN 206464696 9/2017
(Continued)

OTHER PUBLICATIONS

Internationaler Recherchenbericht und Schriftlicher Bescheid [International Search Report and the Written Opinion] dated Jul. 16, 2019 From the International Searching Authority Re. Application No. PCT/EP2019/055651 and Its Translation of Search Report Into English. (11 Pages).

*Primary Examiner* — Hung D Nguyen

(57) ABSTRACT

A method and an apparatus for processing an object by generation of laser radiation as a collimated laser beam, influencing the intensity distribution and/or the phase progression over the cross section of the laser beam, splitting
(Continued)

the laser beam into two partial beams, and deflection and focusing of the partial beams so that the partial beams are superimposed in a processing zone in the material of the object.

14 Claims, 3 Drawing Sheets

(51) Int. Cl.
*B23K 26/066* (2014.01)
*B23K 26/06* (2014.01)

(56) References Cited

U.S. PATENT DOCUMENTS

| | | | |
|---|---|---|---|
| 2003/0057418 A1 | 3/2003 | Asano | |
| 2012/0249989 A1 | 10/2012 | Fujii | |
| 2014/0291308 A1* | 10/2014 | Lasagni | B23K 26/0676 |
| | | | 219/121.75 |

FOREIGN PATENT DOCUMENTS

| | | |
|---|---|---|
| DE | 102006032053 | 1/2008 |
| DE | 102011011734 | 8/2012 |
| DE | 102011119764 | 5/2013 |
| DE | 102013004869 | 9/2014 |
| DE | 102014103748 | 9/2015 |
| EP | 1162519 | 12/2001 |
| WO | WO 2008/049389 | 5/2008 |
| WO | WO 2019/170792 | 9/2019 |

* cited by examiner

METHOD AND DEVICE FOR MACHINING BY MEANS OF INTERFERING LASER RADIATION

RELATED APPLICATIONS

This application is a National Phase of PCT Patent Application No. PCT/EP2019/055651 having International filing date of Mar. 7, 2019, which claims the benefit of priority of German Patent Application No. 10 2018 105 254.5 filed on Mar. 7, 2018. The contents of the above applications are all incorporated by reference as if fully set forth herein in their entirety.

FIELD AND BACKGROUND OF THE INVENTION

The invention concerns a method and an apparatus for processing an object, in particular an optical component, by means of interfering laser radiation.

There are various approaches for processing optical components in order to provide them with certain functionalities. In particular, the use of short or ultrashort laser pulses (pulse duration in the fs- to ps range) for the modification of transparent, partially transparent or even absorptive materials in volume or on the surface has proven to be a key tool. The material of the component is heated locally limited by the high power of the laser pulses, whether up to the threshold at which a plasma is generated in the material by the individual laser pulse or below. The result is a corresponding locally limited modification of the refractive index in the material of the component in the focus of the laser radiation, which is the basis for the function, e.g. as an optical grating.

To process the component in a suitable way, the laser beam used must be focused. Depending on the target and the type of focusing, the laser beam accumulates aberrations of varying intensity from its generation in the (almost) perfectly collimated initial state along the beam path to the target object. These impair the optical imaging quality and enlarge and deform the focal area in the material of the component to be processed. To generate a well-defined focus and an equally well-defined intensity distribution of the laser radiation, optics with a high numerical aperture are required. With increasing numerical aperture of the imaging optics, however, the accumulated aberration increases again.

Frequently, e.g. for the generation of an optical grating, a refractive index modification with a defined (mostly periodic) intensity modulation is desired in the material of the optical component to be manufactured. For this purpose (for reasons of coherence) the collimated laser beam used is split into two partial beams, whereby the partial beams are then deflected and focused so that the partial beams overlap and interfere in a processing zone in the material of the object. The interference pattern (hologram) created in the material is written into the material by the laser pulses. To maintain the coherence condition, a dynamic delay line is typically used in one of the two partial beams (see EP 1 162 519 A1).

For the described procedure to generate modifications in the material of the optical component to be manufactured, the accumulated aberrations are a significant interference factor, since the precision in structuring the material is limited by the aberrations.

Furthermore, a disadvantage of the known approaches for the generation of periodic material modifications is that the mean period of the modification can be influenced by controlling the angle between the two focused partial beams converging in the material, but not the period progression, i.e. the spatial modulation of the period of the generated modification. However, this would be desirable for certain functionalities of optical components.

SUMMARY OF THE INVENTION

Against this background, it is the purpose of the invention to provide a process and apparatus for processing an object by means of interfering laser radiation which is improved compared to the state of the art.

The invention solves this problem by a method according to claim 1, which comprises the following process steps:

Generating laser radiation as a collimated laser beam,
Influencing the intensity distribution and/or the phase progression over the cross section of the laser beam,
Splitting the laser beam into two partial beams, and
Deflection and focusing of the partial beams, so that the partial beams in a processing zone overlap in the material of the object.

Furthermore, the invention solves the problem by means of an apparatus, comprising:

a laser which generates laser radiation as a collimated laser beam,
a phase mask which modifies the intensity distribution and/or the phase progression over the cross-section of the laser beam,
a beam splitter which splits the laser beam into two partial beams, and
a deflection and focusing optic, which superimposes the partial beams in a processing zone in the material of the object.

With regard to the method steps of generating laser radiation as a collimated laser beam, of splitting the laser beam into two partial beams and of deflecting and focusing the partial beams so that the partial beams are superimposed in a processing zone in the material of the object, the method according to the invention corresponds to the state of the art according to the above cited EP 1 162 519 B1.

The invention suggests that the intensity distribution and/or the phase response are influenced over the cross section of the collimated laser beam. For this purpose, a phase mask is used, which in itself is also known from the prior art. Phase masks are used, for example, in the field of photolithography to improve the imaging quality and imaging resolution. A phase mask is a plate of transparent material that is structured so that the laser radiation incident perpendicular to the plane of the plate travels different optical path lengths through the plate over the cross-section of the laser beam. The function of the phase mask is based on the fact that the phase shift of the laser radiation generated when passing through the plate is a function of the optical thickness.

In a possible embodiment, the intensity distribution and/or the phase progression over the cross section of the laser beam is influenced by means of static or dynamic adaptive optical elements in order to flexibly compensate for deviations and non-ideal properties of the optical components used.

The invention is based on the realization that by influencing the intensity distribution and/or the phase progression over the cross section of the laser beam, deviations in the image in the focus of the partial beams in the object to be processed, which are generated by aberrations, can be compensated. Thus, well defined modifications can be produced with a significantly lower power input of the laser beam compared to the state of the art and thus the corresponding functionalities can be generated with high quality.

For the modifications of the object's material to generate the desired optical functionality, pulsed laser radiation is used. The pulse duration is 10 fs to 100 ps and the central wavelength is in the range of 150 nm to 100 µm. A short pulse laser (or ultra-short pulse laser) of a known and commercially available type, for example a titanium-sapphire laser or a mode-locked fiber laser, in which an optical fiber doped with rare earth ions is used as the laser medium, which is optically pumped by a laser diode, serves as the source for generating such laser radiation. In order to achieve the required power, the generated laser radiation is amplified by one or more optical amplifiers, also of a known and commercially available type.

In case of a particularly preferred embodiment of the method according to the invention, the deflection and focusing of at least one partial beam is carried out by means of adaptive optics. The adaptive optics can be used to modify the phase and/or intensity profile over the cross-section of the respective partial beam. The necessary change of direction and focusing of the respective partial beam is achieved by the deflection and focusing optics, as in the state of the art. In the simplest case, this is a combination of a deflection mirror and focusing optics. Alternative implementations are possible, for example based on diffractive optics.

According to the invention, the deflection and focusing optics preferably comprise at least one (static or dynamic) adaptive optical element. Adaptive optical elements are known per se from the state of the art, for example in the form of mechanically deformable or adjustable mirrors or lenses. The adaptive optical element allows a static or dynamic control of the phase/intensity distribution in the respective partial beam. In the sense of the invention, any element known in the art which allows an adaptable control of the wavefront of the laser radiation is suitable as an adaptive optical element. This enables a precise control of the intensity and wavefront progression in the focal interference region in the material of the object. The intensity envelope of the respective partial beam as well as the center period and the period profile of the modifications to be generated in the material of the object can be controlled and influenced in a well-defined way. Any statically or dynamically adaptable reflective or transmissive element known from the state of the art, which modifies the phase and/or intensity progression over the cross section of the partial beam, is suitable as an adaptive optical element. The adaptive optics used according to the invention allows the targeted influencing of the resulting modification, since, for example, undesired aberrations accumulated by the respective partial beam over its course can be individually addressed by the use of permanent or dynamically adaptive mirrors. In particular, the adaptive optics allows the generation of a periodic structure in the material of the object to be processed, whereby the periodic course can be variably modulated by appropriate adaptation of at least one adaptive optical element. In other words, the intensity and/or period course of a structure generated in the object by the interfering partial beams can be flexibly adapted by the invention-appropriate modification of the phase and/or intensity course over the cross section of at least one partial beam.

In a possible configuration, a wavefront sensor (e.g. Hartmann-Shack sensor) is arranged downstream of the dynamically adaptable adaptive optical element in the course of the partial beam, a control unit regulating the phase and/or intensity profile over the cross-section of the partial beam on the basis of the output signals of the wavefront sensor. The control of the wavefront enables an automatic compensation of dynamic imperfections of the optical arrangement, for example due to temperature fluctuations or acoustic disturbances. In this way, a stable high precision in the generation of the desired structures in the material of the object is guaranteed.

According to a further preferred configuration of the invention, it is intended that the deflection and focusing of the partial beams includes an aberration correction. By using, for example, one imaging lens with aberration correction in the deflection and focusing optics of each partial beam, a substantial part of the spherical imaging errors can be compensated. Alternative optical elements for aberration correction, such as a modified prism or a set of suitable prisms, corresponding mirrors, as well as combinations of these elements, are conceivable. The combination of static and dynamic compensation of the occurring aberrations as well as the influence of the intensity and wavefront progression in the focus of the partial beams by means of adaptive optics allows to generate particularly precise and variably adjustable intensity and period courses in the material of the object.

In a possible embodiment of the invention, the phase mask can be integrated into the beam splitter. This results in a particularly compact design that is insensitive to interference.

According to a further preferred embodiment, the deflection and focusing optics have a variable delay section assigned to at least one of the partial beams. The variable delay line serves to ensure the interference of the laser pulses in the focus of the partial beams according to the coherence conditions. The laser pulses must coincide in time in the superposition zone of the partial beams in the material of the object.

In a further preferred embodiment of the apparatus according to the invention, it is intended that at least one static or dynamic adaptive optical element modifies the intensity distribution and/or the phase response over the cross-section of the laser beam.

In a further preferred embodiment of the apparatus according to the invention provision may be made for an imaging optical element, which is arranged in the beam path in front of the beam splitter. The imaging optics in front of the beam splitter causes a modification of the laser beam which is effective in both partial beams. The imaging optics in front of the beam splitter can also include an aberration correction.

BRIEF DESCRIPTION OF THE SEVERAL VIEWS OF THE DRAWINGS

In the following, examples of the invention are explained in more detail using the figures. They show.

In the following figure description the same reference signs and the same terms are used for the same elements.

DESCRIPTION OF SPECIFIC EMBODIMENTS OF THE INVENTION

Figure 1:
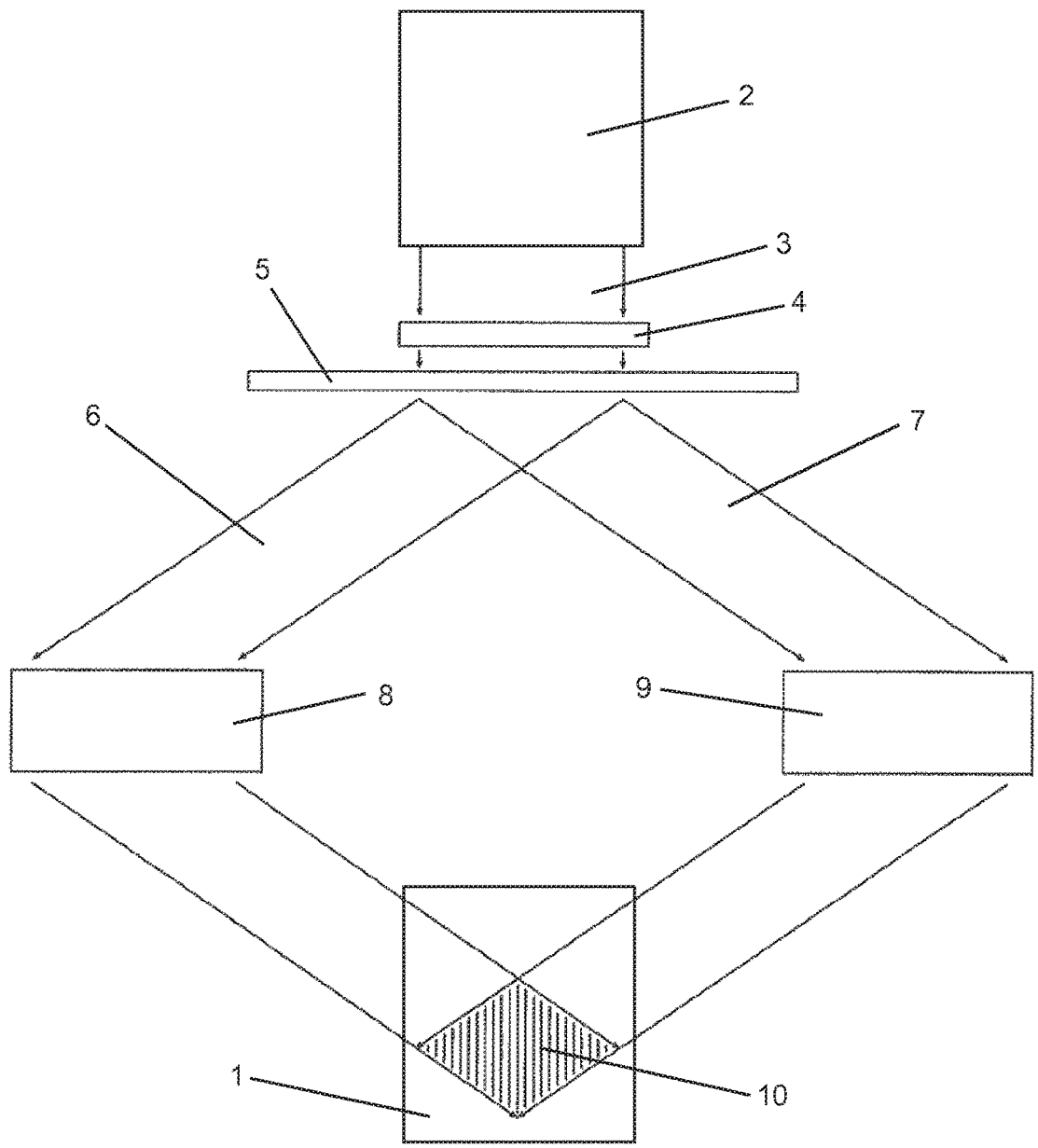
FIG. 1 schematic representation of an apparatus according to the invention.

FIG. 1 shows an example of an apparatus for processing an object 1 by means of interfering laser beams. The object 1 can be made of transparent, partially transparent or absorptive material, in each case related to the wavelength of the laser radiation used. The apparatus comprises a laser 2, which emits pulsed laser radiation with a pulse duration of, for example, 100 fs, whereby the central wavelength is, for example, 1550 nm. The laser 2 emits the laser radiation as a collimated laser beam 3. The laser beam 3 passes through a phase mask 4, which modifies the intensity distribution and the phase response over the cross section of the laser beam 3. Deviations from the ideal beam path caused by non-idealities of the optical components are compensated by the phase mask 4. Next, the laser beam 3 passes through a beam splitter 5, which splits the laser beam 3 into two partial beams 6 and 7. In each of the partial beams 6, 7 a deflection and focusing optics 8 and 9 respectively is provided. The deflecting and focusing optics 8, 9 cause the partial beams 6, 7 to overlap in a processing zone 10 (diamond-shaped in the design examples) in the material of the object 1. In alternative configurations, the two partial beams 6, 7 can enter the object 1 via the same surface. In the same way, the partial beams 6, 7 can, in extreme cases, run in opposite directions. Any beam geometry is conceivable in which the two partial beams 6, 7 overlap in the volume of object 1 or on its surface. The two deflection and focusing optics 8, 9 each comprise at least one adaptive optical element, which is a statically or dynamically adaptable reflective or transmissive element that modifies the phase and/or intensity profile over the cross-section of the respective partial beam 6, 7. The adaptive optical elements allow a control of the intensity and wavefront progression in the focal interference region 10. In this way the intensity envelope of the respective partial beam 6, 7 as well as the center period and the period progression of the modifications to be generated in the material of the object 1 can be controlled and influenced. According to the invention, adaptive optics is combined with an aberration correction to correct imaging errors due to aberrations.

Figure 2:
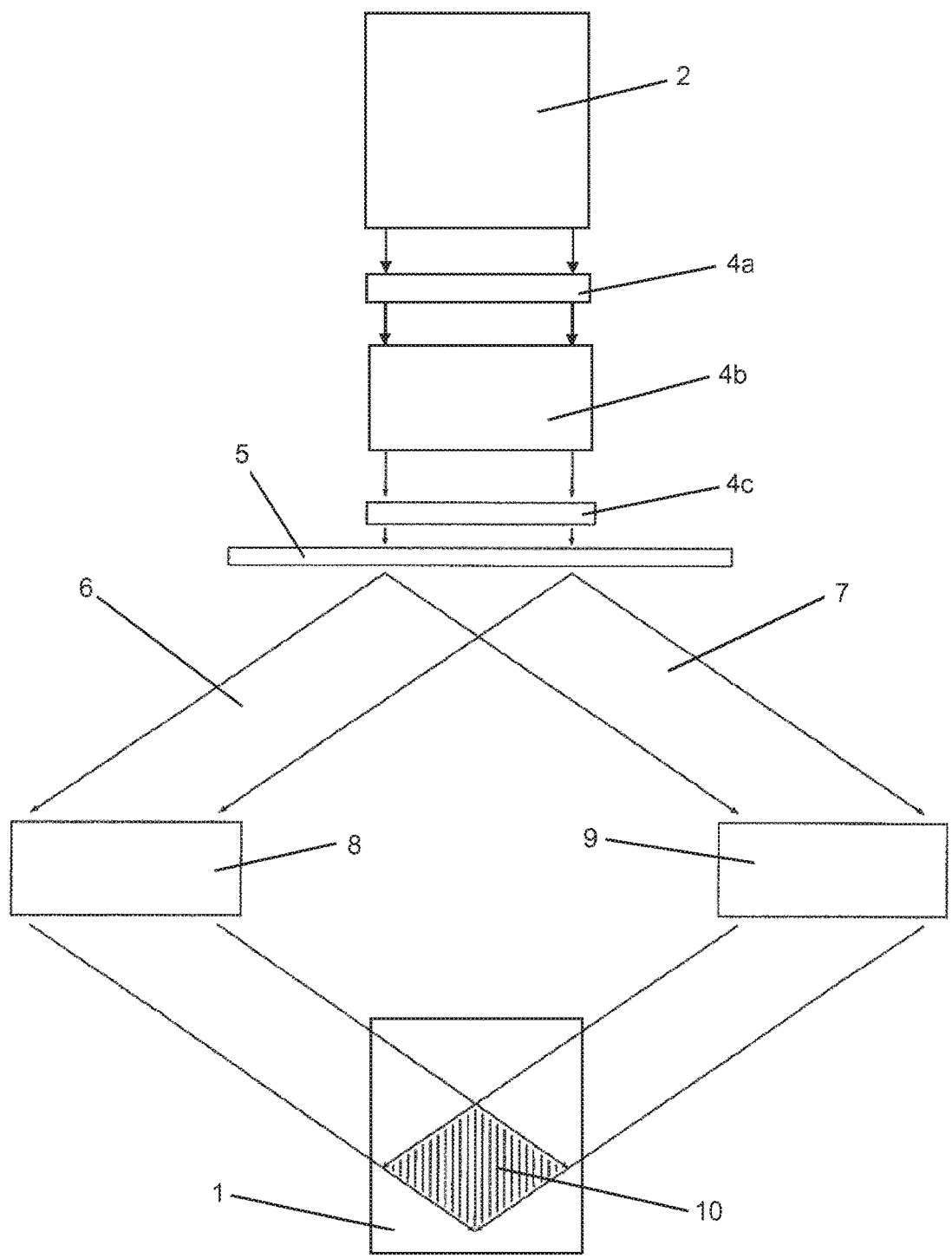
FIG. 2 schematic representation of an apparatus according to the invention in a modified version.

The version of FIG. 2 is largely identical to that of FIG. 1, except for the two adaptive optical elements 4a, 4c for phase and intensity modification and the imaging optics 4b arranged in the beam path in front of the beam splitter 5. The problem of compensation of the system-inherent aberrations and the interactions between diffraction and focusing by high numerical apertures can be solved in a particularly efficient way by the approach illustrated in FIG. 2. By using an imaging optics 4b with aberration correction for a given configuration (e.g. modified prism or several prisms to increase the working distance, mirrors) a large part of the imaging errors can be compensated compared to a spherical optics (e.g. cylindrical lens). The adaptive optical elements 4a, 4c allow additional control of the imaging quality. Again, deflection and focusing optics 8, 9 are used to generate the interference rhombus 10 in the material of the object 1. This allows a large working distance from the phase mask 4a, 4c and additionally a large modulation range. The imaging optics 4b act on both partial beams 6, 7, whereas the deflection optics 8, 9 interact individually with only one partial beam 6, 7. Thus, unwanted aberrations of the individual partial beams (e.g. of the individual diffraction orders in a diffraction-based beam splitter 5) can be addressed by the use of static or dynamic-adaptive mirrors. Furthermore, phase and intensity distribution manipulations can be performed in order to adjust the intensity envelope as well as the central period and the period course of the modifications generated in object 1 in a well-defined manner in the interference region 10.

Figure 3:
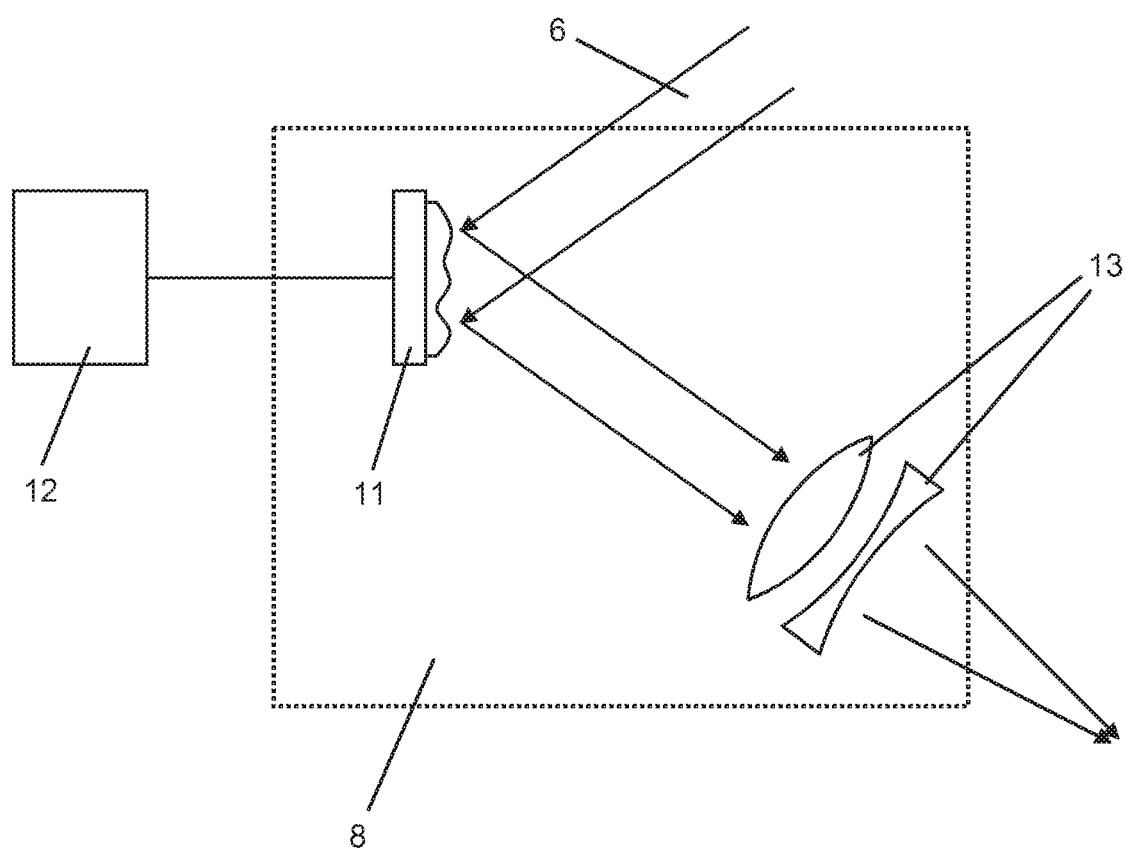
FIG. 3 schematic representation of the deflection and focusing optics in the design example of FIG. 1.

FIG. 3 shows an example of the design of the deflection and focusing optics 8 schematically. For the deflection of the partial beam 6, this comprises a dynamically adaptive mirror 11, which is controlled by an external control unit 12. The adaptive mirror 11 makes it possible to influence the wavefront of the partial beam 6. In this way, unwanted aberrations accumulated by the partial beam 6 over its course can be individually addressed and compensated. In addition, the influence of the wavefront by means of the adaptive mirror 11 allows the generation of a periodic structure in the material of the object 1. The periodic course can be variably modulated by appropriate adaptation of the surface shape of the mirror 11. A focusing optic 13 features an aberration correction. An imaging lens with an additional lens for aberration correction is provided for this purpose. The aberration correction largely compensates for the spherical aberration that occurs. A particular advantage is that the combination of dynamic compensation by means of adaptive optics with static aberration correction allows the wavefront progression in the focus of the partial beams 6, 7 to be adjusted particularly precisely and variably in order to generate the desired intensity and period progressions in the material of the object in a variable manner.

Optionally, a wavefront sensor (not shown) can be arranged behind the adaptive mirror in the design example of FIG. 2 in the course of the partial beam 6. This sensor can be connected e.g. via a beam splitter between mirror 11 and focusing optics 13. The wavefront sensor detects the phase and/or intensity profile via the beam cross section, and the control unit 12 regulates the wavefront accordingly to a target profile.

What is claimed is:

1. A method for processing an object (1) by means of interfering laser beams, comprising the following process steps:

generating laser radiation as a collimated laser beam (3); influencing at least one of an intensity distribution and phase progression over a cross section of the collimated laser beam (3) using a phase mask comprising a plate of transparent material, the phase mask being configured to cause laser radiation incident perpendicular to a plane of the plate to travel different optical path lengths through the plate over the cross-section of the laser beam, and to compensate thereby for deviations and non-ideal properties of other optical components used; splitting the collimated laser beam (3) into two partial beams (6, 7), and deflecting and focusing of each of the two partial beams (6, 7) so that the two partial beams (6, 7) are superimposed in a processing zone (10) in the object (1);

wherein the deflecting and focusing of each of the partial beams (6, 7) comprises interacting with each one of the partial beams (6, 7) individually to apply an aberration correction separately to each of the partial beams (6, 7) using an imaging lens, and controlling a period progression of a modification to be generated in the object (1) by the two partial beams (6, 7) superimposed in the processing zone (10) using at least one adaptive optical element.

2. The method according to claim 1, wherein the laser radiation is pulsed, wherein the pulse duration is 10 fs to 10 ps and the central wavelength is in the range from 150 nm to 10 µm.

3. The method according to claim 1, wherein the deflecting and focusing of at least one partial beam (6, 7) is effected by adaptive optics (11).

4. The method according to claim 3, wherein the adaptive optics (11) modify at least one of a phase profile and an intensity profile over a cross-section of the partial beam (6, 7).

5. The method according to claim 1, wherein by modifying at least one of a phase profile and an intensity profile over the cross-section of at least one partial beam (6, 7), at least one of intensity and period profile of a structure generated in the object (1) by the interfering partial beams (6, 7) is adapted.

6. The method according to claim 1, wherein the influencing of at least one of the intensity distribution and the phase progression over the cross-section of the laser beam is effected by means of static or dynamic adaptive optical elements (4a, 4c).

7. An apparatus for processing an object by means of interfering laser beams, comprising:
- a laser (2) configured to generate laser radiation as a collimated laser beam (3),
- a phase mask (4, 4a, 4c) comprising a plate of transparent material, configured to modify a least one of an intensity distribution and a phase progression of the laser radiation over a cross-section of the collimated laser beam (3), the phase mask being further configured to cause laser radiation incident perpendicular to a plane of the plate to travel different optical path lengths through the plate over the cross-section of the laser beam, and to compensate thereby for deviations and non-ideal properties of other optical components used,
- a beam splitter (5) configured to split the collimated laser beam (3) into two partial beams (6, 7), and
- a deflection and focusing optics (8, 9) configured to superimpose the partial beams in a processing zone (10) in the object (1);
- wherein the deflection and focusing optics (8, 9) comprising at least one adaptive optical element and an imaging lens, the deflection and focusing optics (8, 9) being configured to interact with each of the partial beams to apply an aberration correction separately to each of the partial beams (6, 7) using the imaging lens, and to control a period progression of a modification to be generated in the object (1) by the two partial beams (6, 7) superimposed in the processing zone (10) using the at least one adaptive optical element.

8. The apparatus according to claim 7, wherein the at least one adaptive optical element (11) is selected from a group consisting of an adaptable reflective which modifies at least one of a phase profile and an intensity profile over the cross-section of the partial beam (6, 7) and a transmissive element which modifies at least one of a phase profile and an intensity profile over the cross-section of the partial beam (6, 7).

9. The apparatus according to claim 7, wherein by modification of at least one of a phase profile and an intensity profile over the cross-section of at least one partial beam (6, 7), at least one of intensity and period profile of a structure produced in the object (1) by the interfering partial beams (6, 7) is adapted.

10. The apparatus according to claim 7, further comprising a wavefront sensor arranged downstream of an adaptive optical element (11) in the course of the partial beam (6, 7), and a control unit (12) regulating at least one of a phase and an intensity course over the cross-section of the partial beam (6, 7) on a basis of an output signal of the wavefront sensor.

11. The apparatus according to claim 7, wherein the phase mask (4) is integrated in the beam splitter (5).

12. The apparatus according to claim 7, wherein the deflection and focusing optics (8, 9) having a variable delay path associated with at least one of the two partial beams (6, 7).

13. The apparatus according to claim 7, wherein the adaptive optical element (4a, 4c) modifies at least one of the intensity distribution and/a phase response over the cross-section of the laser beam (3).

14. The apparatus according to claim 7, further comprising an imaging optics (4b) arranged in a beam path before the beam splitter (5).

* * * * *